United States Patent [19]

Raczek

[11] Patent Number: 4,513,486

[45] Date of Patent: Apr. 30, 1985

[54] VALVE RETAINER FOR AUTOMOTIVE VALVE REPAIR

[76] Inventor: Mieczyslaw J. Raczek, 159 Skyview Way, San Francisco, Calif. 94131

[21] Appl. No.: 520,716

[22] Filed: Aug. 5, 1983

[51] Int. Cl.[3] .............................................. B23P 19/04

[52] U.S. Cl. ...................................................... 29/220

[58] Field of Search .......................... 29/215, 219, 220

[56] References Cited

U.S. PATENT DOCUMENTS 1,034,874 8/1912 Clark .................................... 29/220
2,586,050 2/1952 Jensen .................................. 29/219
3,295,193 1/1967 Maness ................................. 29/220

*Primary Examiner*—James L. Jones, Jr.
*Attorney, Agent, or Firm*—Alfons Puishes

[57] ABSTRACT

A device or tool for facilitating removal of overhead automotive valves for inspection and repair of the stem and sleeves comprising a knob operated toggle mechanism which is inserted in the opening left after removal of a spark plug. The toggle mechanism holds the valve tight against the seat on the cylinder head interior permitting removal of the overhead spring and accompanying parts. After completion, the spring and retainer are replaced, the tool removed and the spark plug replaced. This emiminates the use of compressed air for this purpose as was previously the case.

5 Claims, 11 Drawing Figures

1
2
3
4
4a
5
7
8
9
10
11
12
13
14
15
16
17
18

VALVE RETAINER FOR AUTOMOTIVE VALVE REPAIR

BACKGROUND OF THE INVENTION

A difficult problem exists in inspecting and repairing the valves, stems and sleeves of internal combustion engines of the overhead valve type without removing the entire cylinder head. Removing the valve stem retaining nut and spring retainer while assembled would cause the valve to drop into the cylinder. A procedure often used is to remove the sparkplug and insert an air hose relying upon the air pressure to hold the valve up in position against the cylinder head. This practice is somewhat cumbersome, not reliable and hazardouz, and forces oil out of the cylinder down into the crankcase. Since the replacement of the sleeve on the valve stem is a frequent practice, this problem presents considerable difficulty and expense with this operation.

SUMMARY OF THE INVENTION

I have invented a device which comprises a knob operated shaft and toggle mechanism which may be inserted in the cylinder head after removing the sparkplug and operated externally to hold the valve up in position against the cylinder head, permitting the valve spring to be removed and the valve seal replaced with a maximum of speed and convenience.

DESCRIPTION OF A PREFERRED EMBODIMENT

Figures 1A, 1B, 2A, 2B, 2C, 3:
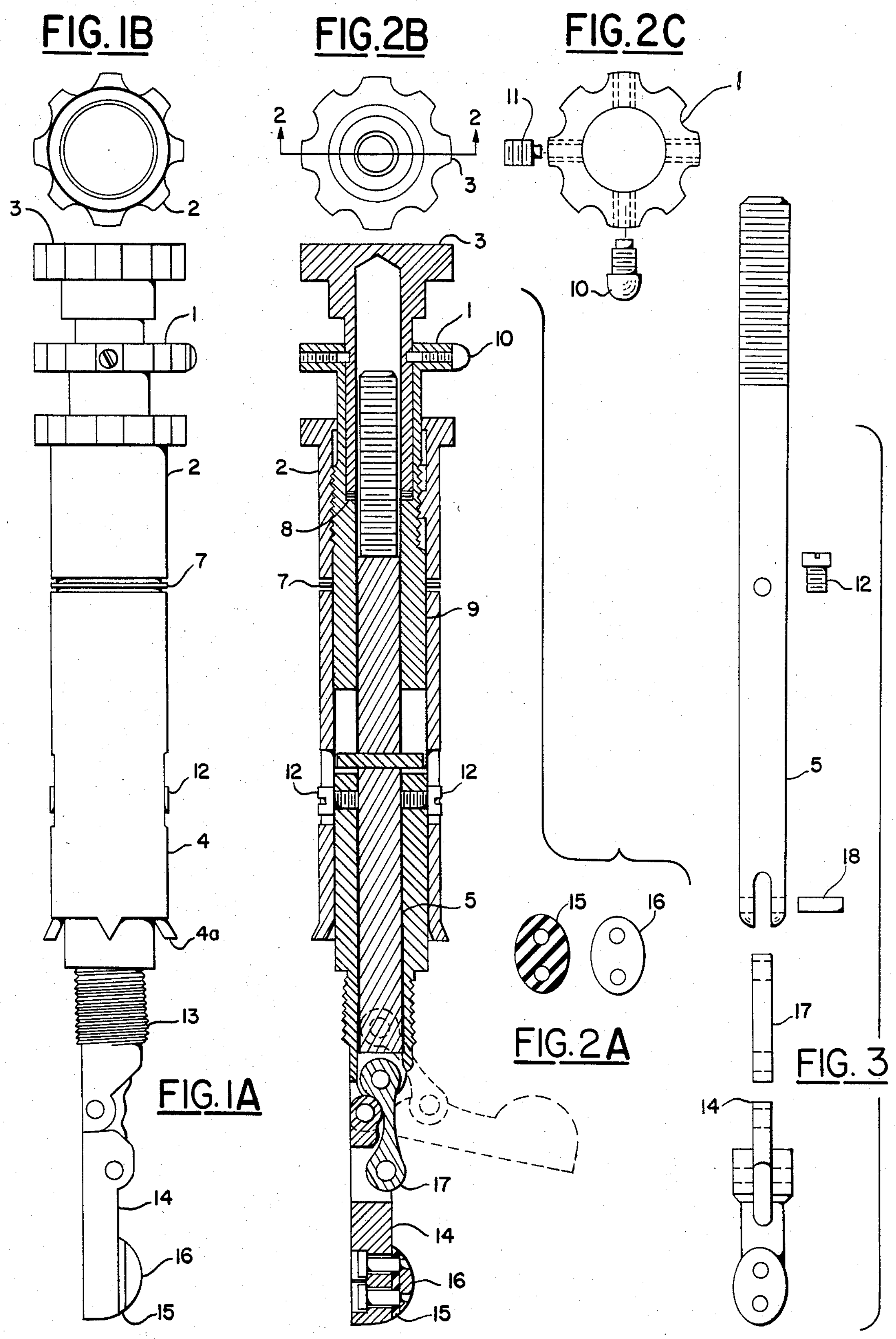
FIG. 1A is an assembly in vertical elevation of the device of my invention.
FIG. 1B is a top view of FIG. 1A.
FIG. 2A is a cross-sectional view of the device of FIG. 1A.
FIG. 2B is a top view of FIG. 2A.
FIG. 2C is a top view of the top knob of FIG. 2A.
FIG. 3 is a detail of part 5 of FIG. 2, being the operating shaft.
Figure 4:
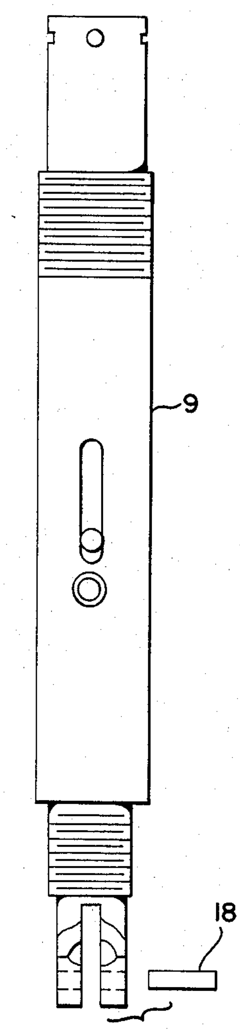
FIG. 4 is a side view of the sleeve members.

Referring now to the figures, and especially to FIG. 1A and FIG. 2A, there is seen first the positioning knob 1 which is utilized for screwing sleeve 9 into the cylinder head by means of threads 13 after removing the sparkplug. An outer flange 2 is utilized as a knob for threading the pronged sleeve or housing 4 into position to engage the surface of the cylinder head and aid in holding the device in position for operation. My toggle operating knob 3 is disposed impart vertical motion to shaft 5 which operates the toggle mechanism described below. The guide pin 6 is press fit into shaft 5 and moves vertically in a slot in sleeve 4. Three set screws 10 engage a circumferential slot in sleeve 9 and a fourth set screw 10 also engaging that slot is equipped with an external indicator which is in alignment with the pin or tip 16, holding the valve in position to indicate its location externally to the operator as explained below. Set screws 12 prevent relative motion of sleeve 4 and sleeve 9 when in a set position.

My valve retaining arm 14 is hinged at the bottom end of shaft 5 through a toggle leverage mechanism 17 to impart motion to arm 14 which is disposed for holding the valve up against the head as described more fully below, particularly with reference to FIG. 6. Arm 14 is equipped with a steel tip 16 fastened to arm 14 through rubber pads 15 to provide a cushioning effect.

Figure 5:
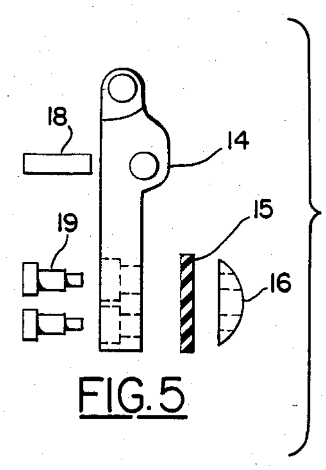
FIG. 5 is a detailed view of the valve retaining arm.

In FIG. 5 are shown a series of details of pins 18 used in the toggle mechanism and rivets 19 used to hold pad 15 against tip 16 and arm 14.

Figure 6:
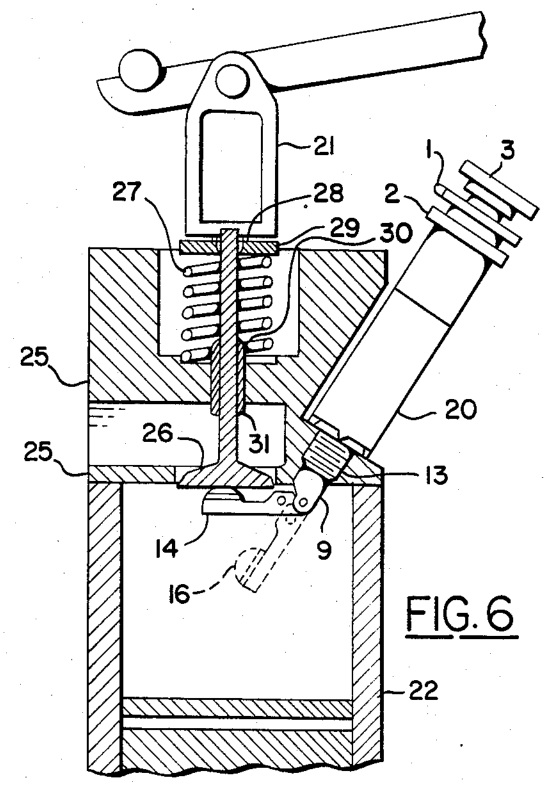
FIG. 6 is a partial section through an automotive cylinder and head showing my device in position and indicating its operation.
Figure 7:
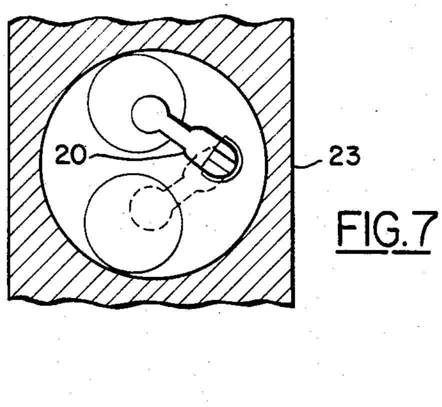
FIG. 7 is a cutaway through a cylinder block showing the interior of the combustion chamber viewing upwards towards the valves with my device in position.

With reference now especially to FIGS. 6 and 7, the operation of my device is as follows. After removal of the sparkplug the device 20 is screwed into the threaded holes with the aid of knob 1. This is continued until the device is reasonably tight and the indicator on the end of set screw 10 shows that the tip 16 is in alignment with the center of the valve 26 which is in its normally closed position up against cylinder head 25. Flange or knob 2 may be used to assist in embedding the prongs at the end of sleeve 4 into the cylinder head for greater stability. Knob 3 is then turned and its threaded section, as shown, causes the shaft 5 to rise and the toggle linkage causes valve retaining arm 14 to rise and bear against the bottom of 26, holding it up against the cylinder head. At this point, a conventional valve spring compressing tool 21 is utilized and by means of the leverage provided by it, spring 27 is compressed, thereby permitting the removal of valve cone halves 28 and valve spring retainer 29, as well as spring 27, permitting access to the valve seal 30 for removal and replacement if necessary and inspection of the valve guide 31 for clearance with the stem of valve 26.

After completion of this operation the steps are reversed, the spring being replaced, compressed and its valve spring retainer and valve cone halves placed in position and the valve spring compressor 21 removed, since the valve is now tightly held.

Inasmuch as the valve 26 is now tightly held against cylinder head 25 in its normal position by means of its spring, my device may be removed and the sparkplug replaced. This is accomplished by loosening knobs 1, 2 and 3 and pulling the device out of the cylinder. It is evident that the entire operation is relatively quick and simple and obviates the necessity of the use of compressed air with its attendant hazards and disadvantages.

Figure 8:
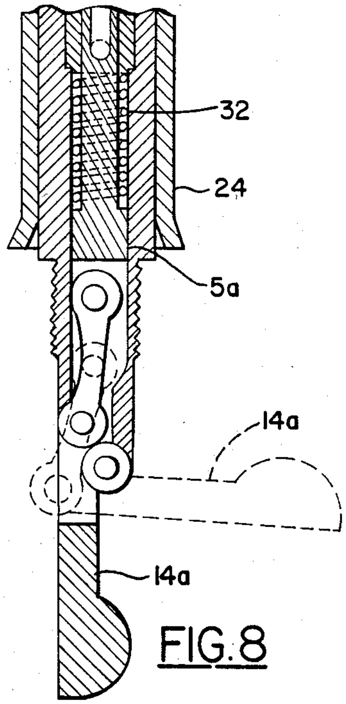
FIG. 8 is a modified embodiment of my invention.

Reference to FIG. 8 will show an alternate embodiment of my invention. In this embodiment I use a dowwnward motion of shaft 5*a* to operate my toggle mechanism and raise valve retaining arm 14*a*, the shaft 5 operating against the action of spring 32. The construction and operation is essentially the same except that the knob 3 is operated in the opposite direction for raising arm 14 against the valve 26.

I claim:

1. A device for facilitating the repair of automotive cylinder valves comprising:

an elongated tool of generally cylindrical configuration, said tool comprising:

- a first hollow cylindrical housing having a first threaded end disposed for threading into a spark plug opening of an automotive cylinder head;
   - a second hollow cylindrical housing concentric with said first housing having a first end disposed for positioning against the outer surface of said cylinder head;

hand operated knobs fixedly positioned on the second end of said housings;

a cylindrical shaft slidably positioned within said first housing engaging threaded means within said housing and disposed to penetrate into the interior of said cylinder;

a knob fixedly positioned on a first end of said shaft disposed for rotating said shaft thereby imparting longitudinal motion thereto;

a two-bar linkage mechanism engaging a second end of said shaft;

a hinged arm forming one link of said mechanism, whereby, upward movement of said shaft causes rotation of said arm in a vertical plane;

the other end of said arm being disposed to engage the under side of a valve in said cylinder head.

2. The device of claim 1 including an indicator positioned on said knob on said first hollow cylindrical housing, said indicator being in alignment with said hinged arm thereby making it possible to determine the relative angular position of said arm with said automotive cylinder.

3. The device of claim 1 including a pair of sharp prongs forming a part of said first end of said second hollow cylindrical housing; said prongs being disposed to bear against the outer surface of said cylinder head to assist in maintaining said second housing in a predetermined fixed position.

4. The device of claim 1 including a steel tip of generally hemispherical configuration, said tip being fixedly positioned on the end of said hinged arm and a rubber pad interposed between said tip and said arm.

5. The device of claim 1 in which said cylindrical shaft is equipped with threaded means engaging said first housing which causes said shaft to move downwards against the action of a spring upon rotation of said knob, whereby said linkage member causes said arm to move upwards in a vertical plane to contact the under side of a valve in said cylinder head.

* * * * *